UNITED STATES PATENT OFFICE.

W. GEORGE MOORE, OF LEBANON, OHIO.

CONDITION-POWDER.

SPECIFICATION forming part of Letters Patent No. 302,761, dated July 29, 1884.

Application filed July 12, 1883. (No specimens.)

*To all whom it may concern:*

Be it known that I, W. GEORGE MOORE, a citizen of the United States of America, residing at Lebanon, in the county of Warren and State of Ohio, have invented certain new and useful Improvements in Medical Compounds; and I do hereby declare the following to be a full, clear, and exact description of the invention, such as will enable others skilled in the art to which it appertains to make and use the same.

This invention relates to certain new and useful improvements in veterinary medicines; and it consists in the combination of certain ingredients which go to make up what is known in veterinary practice as "condition-powders."

My improved composition consists of elecampane-root, flaxseed, juniper-berry, fenugreek, poplar-bark, rosin, mustard, and charcoal, four parts of each, to which is added licorice-root, sulphate of iron, ginger-root, sulphate of soda, and salt, three parts each, to which is added carbonate of soda and gentian-root, two parts each, after which is added black sulphate of antimony, nitrate of potash, coriander-seed, and valerian-root, one part each, after which is added blood-root, lobelia, mandrake-root, and exsiccated or dried alum, one half part each. These ingredients are mixed together and given to the animals with their food. The effect of these ingredients upon the animal is as follows: The elecampane-root, or *Inula Helenium*, acts as a tonic, and also gives relief in case of irritation of the mucous membranes or congestion in the respiratory organs. Flaxseed (*Linum catharticum*) loosens or cleanses the bowels, and acts as a demulcent and emollient. Juniper-berries, or the berries of the plant *Juniperus communis*, act as a stimulant for the urinary and the sweat glands. Fenugreek, or *Fœnum Græcum*, acts as a diuretic, relieves gripes, and tends to increase the appetite. Poplar-bark, or the bark of the tree *Populus tremuloides*, acts as a tonic. Rosin acts upon the urinary organs. Mustard (*Sinapis nigra*) acts as a stimulant and carminative; charcoal as a disinfectant and absorbent, and alters the morbid state of any organ, and the blood, if affected by germs of contagious or infectious diseases. Licorice-root, or *Glycyrrhiza glabra*, is an excellent demulcent and beneficial in case of irritation of the bowels and urinary organs, and relieves congestion in the respiratory organs. Sulphate of iron is an excellent tonic. Ginger-root, or the root of the plant *Zingiber officinale*, relieves gripings of the bowels and acts as a stimulant. Sulphate and carbonate of soda correct acidity. Gentian-root, or *Gentiana lutea*, acts as an appetizer and assists digestion. Black sulphuret of antimony acts as an emetic or cathartic. Nitrate of potash acts upon the mucous membranes. Coriander-seed, or *Coriander sativum*, acts as an aromatic stimulant. Valerian-root, or *Valeriana pauciflora*, is an anti-spasmodic, and is soothing to nervousness. Blood-root, or *Sanguinaria Canadensis*, excites the stomach and accelerates the circulation of the blood. Lobelia, or *Lobelia inflata*, is emetic and expectorant. Mandrake-root, or *Podophyllum peltatum*, is a narcotic, and alum is highly astringent.

The ingredients above described possess other medicinal qualities which it has not been thought necessary to mention, and the powders tend to invigorate the whole system of the animal, and keep it in a lively and healthy condition, and it also acts as a preventive in case of contagious disease.

While the proportions here given of the several ingredients are deemed to be the best, I do not limit myself to the precise quantity specified for each.

One table-spoonful of the mixture is an average dose when used as a preventative, and is mixed with the usual quantity of oats, corn, or other food given at each meal. In cases of sickness the dose may be increased.

I am aware that the several ingredients of this composition have been used separately in condition-powders, and that several of them have been combined; but I do not claim a composition made up of a part of the above-named ingredients.

Having thus described my improved condition-powders, which are adapted to be given with feed to horses, cattle, sheep, swine, and poultry, what I claim is—

The herein-described medicinal composition or condition-powder, consisting of elecampane-root, flaxseed, juniper-berries, fenugreek, poplar-bark, rosin, mustard, charcoal, licorice-root, sulphate of iron, ginger-root, sulphate of soda, salt, carbonate of soda, gentian-root, black sulphate of antimony, nitrate of potash, coriander-seed, valerian-root, bloodroot, lobelia, mandrake-root, and alum, in about the proportions set forth.

In testimony whereof I affix my signature in presence of two witnesses.

W. GEORGE MOORE.

Witnesses:
　JACOB M. SHROCK,
　HENRY DAY.